United States Patent [19]
Cenis

[11] 3,981,604
[45] Sept. 21, 1976

[54] LINER BUSHING
[75] Inventor: Thomas N. Cenis, Westfield, Mass.
[73] Assignee: Joseph J. Mele, Huntington, N.Y.
[22] Filed: Dec. 10, 1975
[21] Appl. No.: 639,248

Related U.S. Application Data
[63] Continuation of Ser. No. 499,452, Aug. 22, 1974, abandoned.

[52] U.S. Cl. ............................ 408/72 B; 408/241 B
[51] Int. Cl.² ........................................ B23B 49/02
[58] Field of Search ........... 408/241 B, 72 B, 115 B; 308/39

[56] References Cited
UNITED STATES PATENTS

| | | |
|---|---|---|
| 2,058,298 | 10/1936 | Chesley............................ 408/72 B |
| 3,104,136 | 9/1963 | Merriman......................... 408/241 B |
| 3,204,284 | 9/1965 | Merriman......................... 408/241 B |
| 3,756,736 | 9/1973 | Marcoux ..................... 408/241 B X |
| 3,768,918 | 10/1973 | Bethke......................... 408/241 B X |

*Primary Examiner*—Othell M. Simpson
*Assistant Examiner*—W. R. Briggs

[57] ABSTRACT

A liner bushing for tooling plates or jigs having longitudinally extending grooves, or slots, on the inner surface thereof.

9 Claims, 6 Drawing Figures

U.S. Patent  Sept. 21, 1976  3,981,604
FIG.1 PRIOR ART
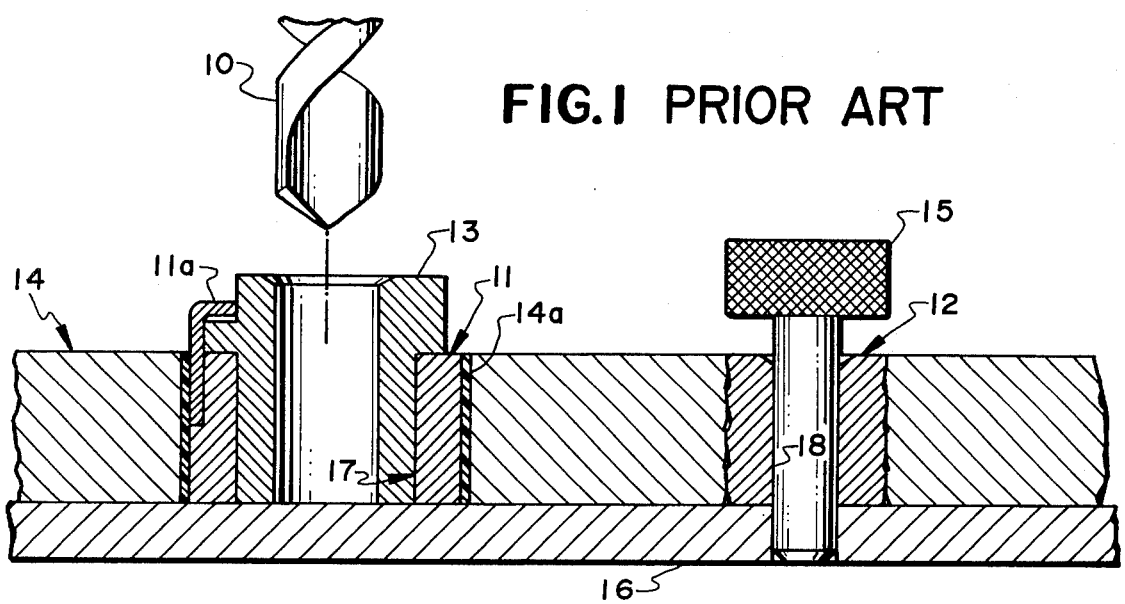
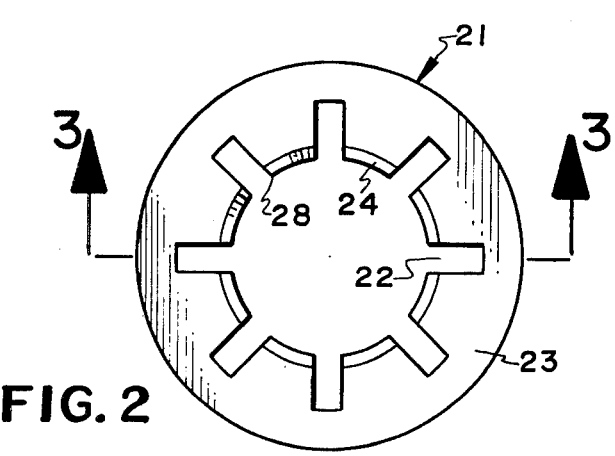
FIG. 2
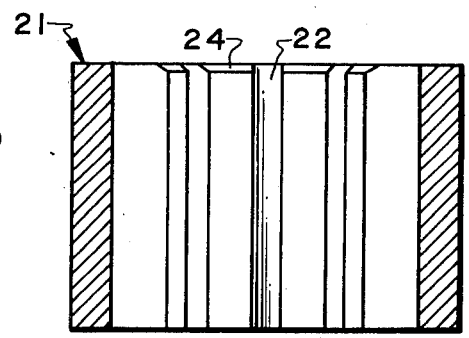
FIG. 3
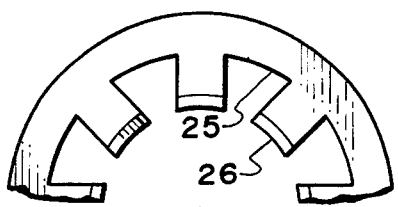
FIG.4
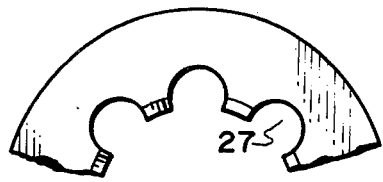
FIG.5
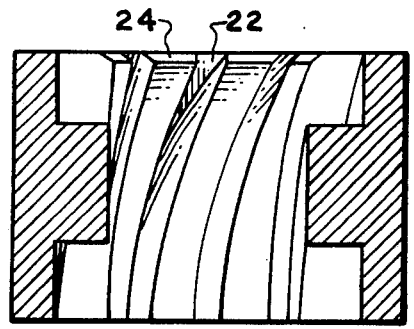
FIG.6

LINER BUSHING

This is a continuation of patent application Ser. No. 499,452, filed Aug. 22, 1974, now abandoned.

This invention relates to liner bushings for use with slip-renewable, or drill guide bushings and to index bushings for use with locating pins. The term liner, bushing, or simply liner, will be understood to include index, or pin, bushings. A liner bushing is made of hard material, such as tool steel, and is used to line an aperture in a softer material tooling plate, jig fixture or the like. The liner may be press fitted into the aperture or held in the tooling plate by potting in a resinous material, with the bore of the liner being precisely located relative to some reference location.

The liner bushings prior to my invention were made with smooth inner surfaces. In my invention the inner surface of the liner is provided with longitudinal grooves or slots. It should be noted that slotted drill guide bushings having specially designed slots have been proposed in the past in U.S. Pat. Nos. 1,617,554 and 1,612,205 for breaking up the chips where the unbroken chips could lead to inconvenience and interruption of normal working. It has been proposed also that such slots in boring bar guide bushings would tend to reduce heat expansion and seizing of the guide to a rotating boring bar. However, the present invention relates to a liner bushing which can be used for receiving a locating pin or a drill guide, both of which are non-rotating in the liner bushing. Whether or not the drill guide or slip renewable bushing itself is slotted is not germane to this invention.

My new construction solves certain problems which have been present with prior art liners. For example, when a liner bushing is pressed into an aperture, there may be some collapse of the liner such that the bore of the liner must be resized by lapping. In the prior bushings the surface area to be lapped is much greater in the new bushing with consequent greater cost in time and materials.

Another problem arises when a tool or jig is stored for some time and corrosion results in the liner. If, in an index bushing, the locating pin was left in the bushing during storage, the resulting corrosion may cause the pin to adhere to the liner. In prior liners, removal of the pin was extremely difficult or even impossible without injury to the pin or liner. In the new liner, the pin needs only to be rotated in the liner to clean the surface of the pin by scraping the pin against the edges of the slots or grooves in the liner bushing. After several turns, the pin can be removed easily from the liner. In more obstinate cases, the liner's slots, grooves or flutes may be used to carry penetrating fluid to the pin more quickly than would be possible in the smooth surface liners.

In cases where the index bushing experiences corrosion with no pin stored in the bushing it may be difficult to insert a pin therein but the slotted bushing again has an advantage. A slight twisting motion as the pin is pushed in will clean the liner while the edges of the slots scrape the accumulated corrosion off the pin. The corrosion drops through the grooves and does not build up a ridge as the pin is forced through the liner bushing.

The slip renewable bushing, which is used during drilling operations for drill guiding, experiences a significant rise in temperature which is transmitted through the liner bushing to the resinous compound which holds a potted liner bushing the place. If the temperature rise of the potting compound is sufficiently great, the liner bushing may be loosened and the bushing moved out of position. In the new liner bushing, the area of contact between the liner and the slip renewable bushing is smaller than that in prior liner bushings by virtue of the slots in the new liner. Thus, the heat transmitted through the new liner is less than before and the temperature of the potting compound is kept well below its softening point. For additional safety, a cooling fluid may be pumped through the slots or grooves in the liner bearing.

The slotted inner surface of the liner bushing provides another subtle advantage in that the machinist would find it impractical to drill without a slip renewable bushing in place — the slots interfering with smooth drilling action. Thus, any attempt to use a drill of the wrong size, i.e. one corresponding to the size of the bore of the liner bushing, would be immediately brought to the attention of the machinist, so that corrective action could be taken. This is particularly important where untrained or poorly motivated machinists are employed.

The slots in the new liner bushing are preferably substantially rectangular in shape for ease of manufacture. Other shapes, such as rounded or circular, work equally as well but may involve some production problems. The size and number of slots, or the surface area removed, are not of critical importance but enough surface must be left to provide adequate strength. The slots should, of course, be equally spaced around the periphery of the liner's inner circumference for symmetry.

From the foregoing discussion, it will be seen that there are many advantages in the slotted liner bushing and the object of this invention is to make use of all those advantages. Thus, it is one object of this invention to make a liner bushing which reduces the possibility of incurring retooling costs by prolonging the useful life of the bushing itself and by reducing the probability of loosening potted bushings through excessive heating of the potting compound. It is another object of this invention to reduce costs in the initial tooling by reducing the time and materials involved in lapping or refinishing the bore of a collapsed liner bushing.

For a more complete understanding of this invention reference may be had to the accompanying diagrams in which:

FIG. 1 illustrates two prior art liner bushings.

FIG. 2 is a top view of a liner bushing embodying the present invention.

FIG. 3 is a longitudinal section through 3—3 of FIG. 2.

FIG. 4 is a modification of FIG. 2.

FIG. 5 is another modification of FIG. 2.

FIG. 6 is a modification of FIG. 3.

With reference now to FIG. 1 of the drawings. There are shown two different prior art liner bushings 11 and 12, similar to those described in U.S. Pat. No. 3,306,137 issued Feb. 28, 1967 and U.S. Pat. No. 3,349,649 issued Oct. 31, 1967 respectively. Liner bushing 11 is adapted to receive and hold slip renewable bushing 13 and is itself held in the tooling plate by adhesive 14a for example. An upright member 11a on bushing 11 prevents bushing 13 from rotation or axial movement in bushing 11 as the drill 10 is rotated therein.

Liner bushing 12, held in plate 14 by a press fit and commonly known as an index bushing, receives locating pin 15 for registration of the tooling plate 14 over the work piece 16. FIG. 1 is illustrative of the different types of uses for liner bushings and of two distinct means for retaining the bushings in a tooling plate, but should not be considered as limiting this invention in any way. It will be understood that in the prior art bushings shown, the inner surface 17 of line 11 and the inner surface 18 of liner 12 are smooth, continuously cylindrical surfaces and that the present invention is confined to the structure of the inner surface of the liner bearing.

FIGS. 2 and 3 are a top view and a sectional view, respectively, of a liner bushing 21 embodying the present invention which may be applied to either bushing 11 or 12 of the prior art FIG. 1. The bushing 21, made of tool steel, for example, has an outer cylindrical surface and an inner bore with a plurality of longitudinal grooves 22 on its inner surface, as shown in FIG. 3. The grooves 22 extend parallel to the central axis of the bushing 21 although they may be helical or spiral in nature and skewed to the axis of the bushing 21 as shown in FIG. 6.

The cross section of each groove 22 is preferably rectangular and radially disposed as shown in FIG. 2, leaving substantially trapezoidally shaped splines 23 between adjacent grooves 22. The inner surfaces 24 of the internal splines 23 define a cylinder and constitute the interfacing surfaces between the slip bushing, such as bushing 13, or pin, such as pin 15, and the liner bushing 21.

The cross sectional shape of the grooves 22 may take many other forms such as that in FIG. 4 where the groove 25 in trapezoidal and the spline 26 is rectangular or in FIG. 5 where the grooves 27 are rounded; e.g. part of a circle or conic in cross section. From these few examples of FIG. 2, 4 and 5 it will be understood that the shape of the grooves can take many forms within the scope of this invention. Manufacturing ease may dictate which of many is most advantageous, but at this time the form shown in FIG. 2 is preferred.

The number and size of the grooves 22 (and consequently the splines 23) are not critical but the bushing 21 must be able to withstand the expected loads so as to preserve the centering or locating function of the bushing.

It will be recognized that as a pin, such as pin 15, is twisted in the bushing 21 the sharp edges 28 for example of the splines 23 will scrape the pin clean to remove any corrosion or foreign matter from its surface. This twisting will aid in the extraction of a pin from a bushing in which it may have become seized by corrosion or resin, when used with bonding fixtures. Furthermore, the grooves 22 will permit a penetrating fluid or solvent to reach more of the surface of the pin quickly to soften the corrosion or resin, if desired.

A slip bushing, such as bushing 13, is generally inserted into the liner bushing 22 with a twisting motion. This action will scrape the surface of the inserted component as it enters the bushing to remove any material which might impede its insertion into a liner bushing and will also clean the surface of the liner itself.

In press fitted liner bushings the bushing 22 may collapse slightly, necessitating a resizing of the bore to the desired size. The lapping or honing operation is carried out more quickly in the present slotted bushing due to the reduced area which requires rework.

The invention having been described with respect to the several embodiments shown, the description should not be considered as limiting the invention in any way, but it should be recognized that modifications other than those shown and described fall within the size of the following claims:

I claim:

1. A liner bushing for holding a first member in alignment with respect to a second member to which said liner bushing is secured, said liner bushing being generally cylindrical and having an axial opening therethrough mating with said first member, a plurality of radially inwardly extending splines separated by a plurality of grooves in the peripheral surface of said opening, the inner extremities of said splines defining an alignment surface for said first member, the inner corners of said splines forming scraping edges whereby contamination on said first member is removed by twisting said first member in said bushing.

2. The device in claim 1 in which the splines extend from one face of said bushing to the opposite face of said bushing.

3. The device in claim 2 in which said splines are parallel to the axis of said opening.

4. The device in claim 3 in which said splines are regularly spaced.

5. The device in claim 2 in which said splines are skewed with respect to the axis of said opening.

6. The device in claim 5 in which said splines are helical.

7. The device of claim 1 in which the grooves have a rectangular cross section.

8. The device of claim 1 in which the grooves have a conic cross section.

9. The device of claim 1 wherein said liner bushing is adhesively held in said second member, said alignment surface also providing a limited heat exchange area between said inserted member and said liner bushing to thereby limit heat conduction to said liner bushing whereby softening of said adhesive is precluded.

* * * * *